July 9, 1957            R. M. GREGG           2,798,734

SEMI-TRAILER TANDEM AXLE ASSEMBLY WITH ONE AXLE STEERABLE

Filed Jan. 18, 1954           3 Sheets-Sheet 1

INVENTOR.
ROBERT M. GREGG
BY
Bean, Brooks, Buckley & Bean
ATTORNEYS

July 9, 1957  R. M. GREGG  2,798,734
SEMI-TRAILER TANDEM AXLE ASSEMBLY WITH ONE AXLE STEERABLE
Filed Jan. 18, 1954  3 Sheets-Sheet 2

INVENTOR.
ROBERT M GREGG
BY
Beau, Brooks, Buckley, Beau,
ATTORNEYS

July 9, 1957 R. M. GREGG 2,798,734
SEMI-TRAILER TANDEM AXLE ASSEMBLY WITH ONE AXLE STEERABLE
Filed Jan. 18, 1954 3 Sheets-Sheet 3

INVENTOR.
ROBERT M. GREGG
BY
Bean, Brooks, Buckley & Bean.
ATTORNEYS

United States Patent Office 2,798,734
Patented July 9, 1957

2,798,734

SEMI-TRAILER TANDEM AXLE ASSEMBLY WITH ONE AXLE STEERABLE

Robert M. Gregg, Buffalo, N. Y., assignor to Michael A. Carmody, Buffalo, N. Y.

Application January 18, 1954, Serial No. 404,509

4 Claims. (Cl. 280—81)

My invention relates in general to improvements in trucks and tractor-semi-trailer combinations and in particular to a steering mechanism for the rear axles thereof.

It is well known to those skilled in the art that in many of the present trucks or tractor-semi-trailer combinations, it is the practice to use two rear axles on the trailer part with one or two sets of tires on each axle.

It is also well known that when a truck or trailer so equipped is steered around a corner, there is relative lateral movement of one or more pairs of tires upon and with the surface of the pavement which causes wasteful and serious scuffing of the rubber of the tires.

The principal object of my invention is to provide an automatically actuated steering mechanism for one set of wheels so that scuffing of the tires is substantially eliminated.

Another object is to provide a two-part axle, the parts thereof being relatively movable in axial direction so that one part may assume a steering position with respect to the body of the truck or trailer.

A further object is to provide means for steering a truck or trailer by and through movement of the vehicle itself.

Moreover, my device is so designed that relative movement between the tires and the vehicle body when steering permits relative movement of the axle parts and results in a steering movement of the movable part of the axle.

Furthermore, my steering device for the vehicle is actuated by contact of the tires with the pavement to actuate the steering mechanism.

The above objects and advantages have been accomplished by the device shown in the accompanying drawings, of which:

Figure 1:
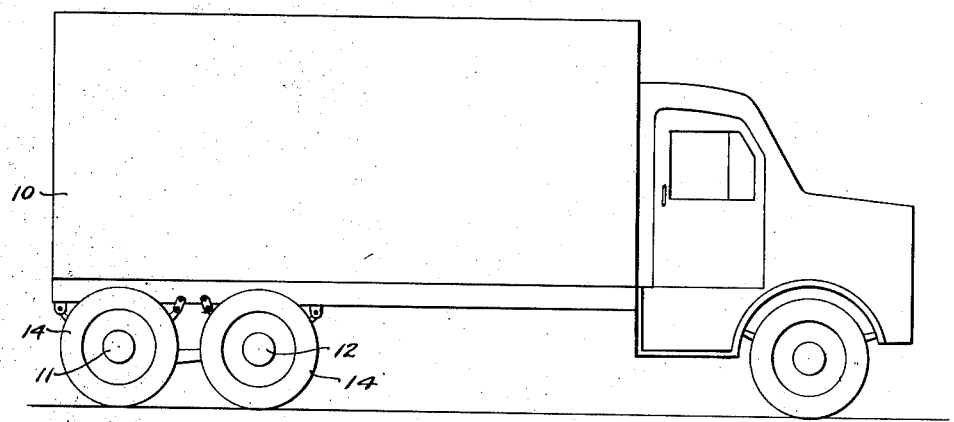
Fig. 1 is a side elevation of a truck equipped with my invention.
Figure 2:
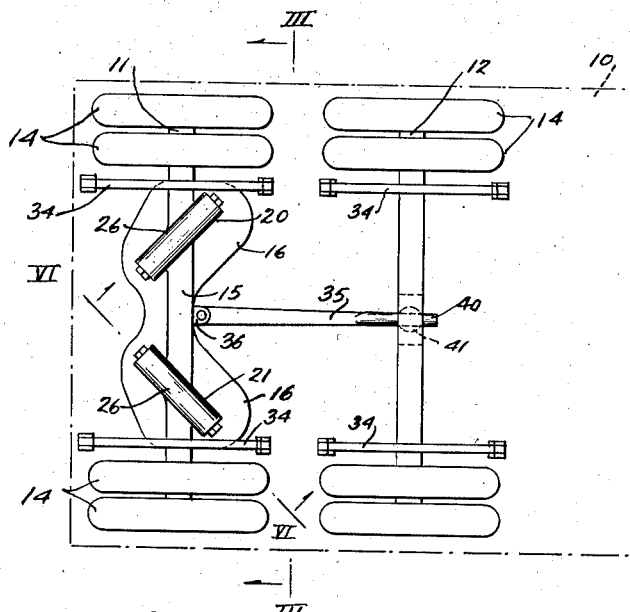
Fig. 2 is a plan view of the mechanism with the truck body removed.
Figure 3:
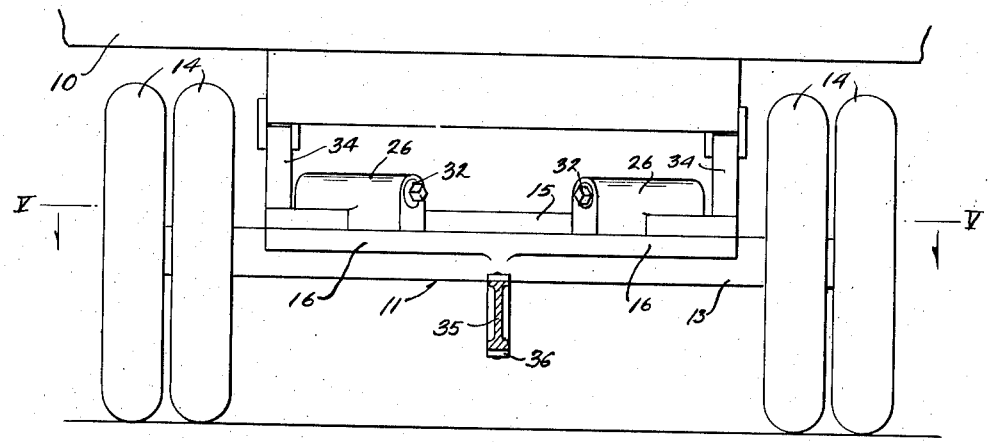
Fig. 3 is a sectional elevation taken on line III—III of Fig. 2.

As shown in Fig. 1 my invention is applied to a truck having a body 10 supported at the rear by a rear axle 11 and by a forward axle 12. As will be clear from Fig. 2 when a truck or the trailer of a tractor-semi-trailer combination is thus equipped, one or the other of these axles will be moved axially with relation to the other when the body of the truck or trailer is moved laterally when rounding a corner. Obviously, such axial movement will cause the tires to slide upon the pavement thereby scuffing and wearing off the rubber thereof at a much wasteful rate. My invention is designed to steer one or the other of the axles when the vehicle is being turned, the steering action being accomplished by and through contact of the tires of one of the axles, thereby causing the selected axle to be steered so as to direct the tires carried by it in the same direction of turning as the truck or trailer.

Referring now particularly to the form of invention shown in Figs. 2 to 7, inclusive, one of the axles of the truck or trailer is equipped with my steering mechanism. As illustrated, the rear axle is shown so equipped, but it is obvious that either axle may be provided with my steering mechanism.

The device comprises a rear axle part 13 upon the ends of which is mounted one or two pairs of tires 14. Superimposed over the lower axle part 13 is the upper axle part 15 of my device. The lower axle part is provided with a bearing pad 16 extending from each side thereof and forming a support for the upper axle part 15. The upper axle part is provided at one end with an obliquely-arranged arm 20 and at the opposite end with an obliquely-arranged arm 21. These arms extend preferably from each side of the upper axle part. The arm 20 is formed with a slot 22 and the arm 21 with a slot 23. The slots 22 and 23 are inclined with respect to the axis of the axle and are preferably symmetrically arranged about the center of the axle being so positioned that if the slots were continued they would meet and join on the line drawn perpendicular through the axis of the axle. Instead of the straight slots 22 and 23, it is obvious that any other suitable camming surface may be employed for producing the steering action of the axle.

Steering pins 24 and 25 are carried by the lower part of the axle 13 and are extended upwardly therefrom being disposed in the slots 22 and 23, respectively. Forming a part of the arms 20 and 21 is a housing 26 which is arranged immediately above the slots thereof. The steering pin of each arm is provided with a head 30 which is slidably mounted within a cylindrical bore 31 formed in the housing. The housing is provided with an abutment nut 32 at each end thereof, and a helical spring 33 is mounted within the cylindrical bore at each end of the housing, having one end thereof bearing against the head 30, and the opposite end bearing against the abutment nut 32. By means of these helical springs, the steering pins will be kept normally in their neutral positions, and the tension thereof may be adjusted if desired by means of the nuts 32.

Figure 4:
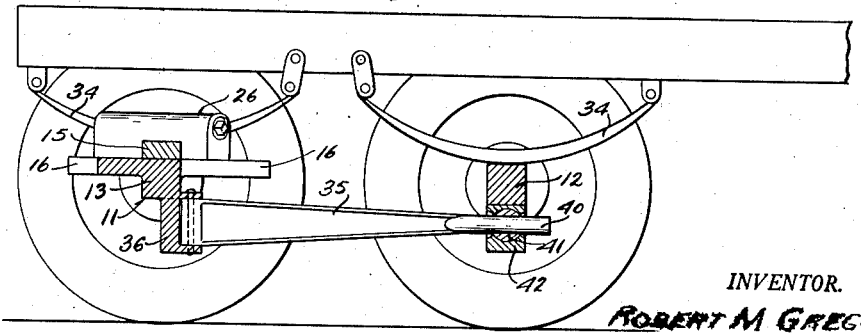
Fig. 4 is an enlarged fragmentary side elevation of my invention.

For convenience of illustration, both axles are shown as being supported by elliptic springs 34 attached to the axles and to the body 10 by suitable well known means. As shown in Fig. 4 a torque rod 35 is provided for counteracting the rotative tendency of the axles. This rod is preferably pivotally mounted to a bracket 36 carried by the lower part of the rear axle, and extending forwardly where it is provided with a cylindrical portion 40 mounted within the ball 41 of a ball and socket joint 42. This arrangement permits the rear axle to be steered with respect to the forward axle while maintaining the rotative relation of the axle parts.

Figure 5:
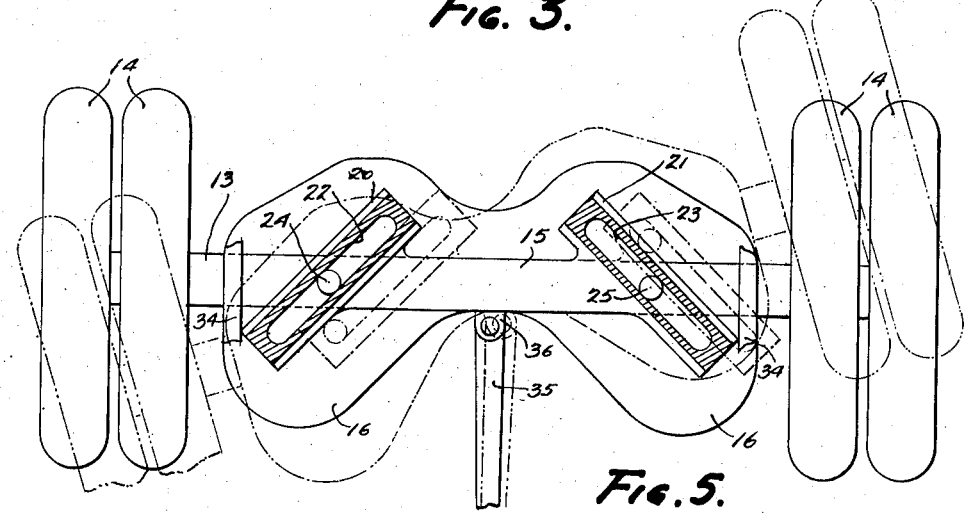
Fig. 5 is an enlarged fragmentary sectional plan view taken on line V—V of Fig. 3.

As shown in Fig. 5 in full lines, the axle parts are in their normal positions. When, however, the vehicle is steered so that there is a movement of the body in clockwise direction, the portion of the body over the rear axle will tend to move sidewise against the frictional contact of the tires of this particular axle upon the pavement. Since skidding or scuffing action of the tires presents considerable resistance against movement, and since the upper axle part is permitted to move with respect to the lower axle part, the upper axle part will be moved from the full line position to the dot and dash line position in this figure. When thus moved, the steering pins will be forced in opposite directions toward the ends of the engaged slots and will assume the positions shown by the dot and dash lines of this figure. Since the steering pins are carried by the lower part of the axle, this axle part will be steered carrying with it the wheels as shown by the double dot and dash lines of this figure. These wheels, therefore, instead of scuffing laterally along the pavement will be steered to roll in substantially the line of travel of the vehicle. Obviously, when the vehicle body is moved in a counterclockwise direction, the wheels of the rear axle will also be steered in the opposite direction.

Figure 7:
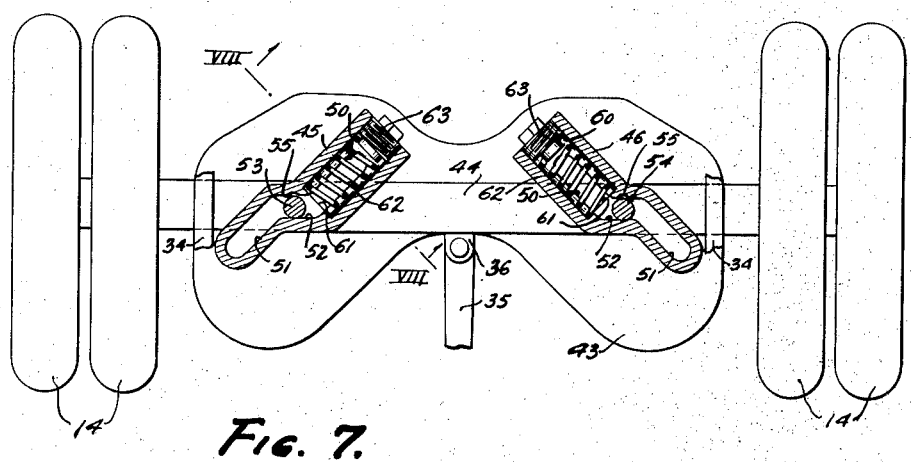
Fig. 7 is an enlarged sectional plan view of a modified form of invention.
Figure 8:
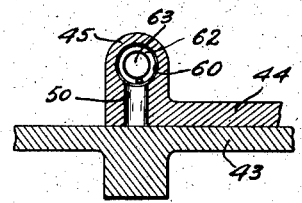
Fig. 8 is a transverse sectional elevation taken on line VIII—VIII of Fig. 7.
Figure 6:
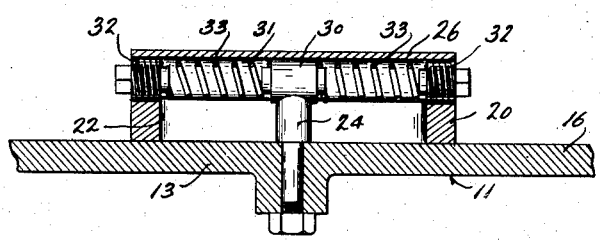
Fig. 6 is an enlarged fragmentary sectional elevation taken on line VI—VI of Fig. 2.

In the form of invention shown in Figs. 7 and 8, there is provided a lower axle part 43 and an upper axle part 44. Each of the obliquely-arranged arms 45 and 46 of this form is provided with a rearwardly extending oblique slot 50 and with a forwardly extending slot 51. The slots of each arm, as shown in Fig. 7, are in offset relation and are connected by a laterally arranged straight slot 52 of substantially the same dimension. As shown in Fig. 7 where the device is shown in normal position, the steering pins 53 and 54 will be positioned in the lateral slots 52 where they will act as an abutment during straight line motion of the vehicle. In order to assure the positioning of the pins under normal conditions within the lateral slots a slight indentation 55 is made in the rear face of each of the slots 52. When a vehicle, equipped with this form of invention, is steered so that the body moves in clockwise direction, as viewed in Fig. 7, the pins 53 and 54 will first be moved out of the lateral slots 52, the pin 53 being thereafter brought into engagement with the oblique slot 51 and the pin 54 brought into engagement with the oblique slot 50 of the opposite arm 46.

The rear portions of the arms 45 and 46 which surround the slots 50 are each provided with a counterbore 60. This counterbore provides a shoulder 61 against which the inner end of a helical spring 62 is brought to bear. A nut 63 is carried at the outer end of the counterbore forming an abutment for the outer end of the spring and providing means whereby the tension of the spring may be adjusted. When either of the steering pins 53 or 54 enters the slot 50 of either arm, it will be brought to bear against the spring which will thereby be placed under further tension and which, when the vehicle is steered back again to straight line movement will serve to aid in returning the axle parts to their normal positions.

When this modified form is brought into operation, one of the pins is first moved out of the coacting lateral slot 52 and into the connected oblique slot depending upon the direction of movement of the body.

While I have shown a number of forms of apparatus for carrying out my invention, it is obvious that other forms within the scope of the appended claims may be used; and I do not, therefore, wish to be limited to the exact embodiments herein shown and described.

What is claimed is:

1. The combination with a vehicle having more than one pair of rear wheels, each pair being mounted upon separate axles and arranged in tandem, one of the axles being steerable and comprising an upper part carried by the body and movable laterally therewith, a lower part disposed beneath said upper part and providing a bearing support for said upper part, obliquely-arranged arms carried by said upper part and arranged one on each side of the longitudinal axis of the vehicle, the axes of said arms being so arranged that they converge in said longitudinal axis, each of said arms being formed with two offset slots joined by a substantially straight slot, said straight slot having its axis normal to said vehicle axis, and steering pins carried by said lower part and engageable with the coacting slots of said arms, whereby relative shifting of the axle parts in an axial direction will cause the lower axle part to be steered in the direction of travel of the vehicle.

2. The combination with a vehicle having more than one pair of rear wheels, each pair being mounted upon separate axles and arranged in tandem, one of the axles being steerable and comprising an upper part carried by the body and movable laterally therewith, a lower part disposed beneath said upper part and providing a bearing support for said upper part, obliquely-arranged arms carried by said upper part and arranged one on each side of the longitudinal axis of the vehicle, the axes of said arms being so arranged that they converge in said longitudinal axis, each of said arms being formed with two offset slots joined by a substantially straight slot, said straight slot having its axis normal to said vehicle axis, steering pins carried by said lower part and engageable with the coacting slots of said arms, and a helical spring disposed in one of each of the pairs of offset slots and bearing against the engaged steering pin, whereby relative shifting of the axle parts in an axial direction will cause the lower axle part to be steered in the direction of travel of the vehicle.

3. The combination with a vehicle having more than one pair of rear wheels, each pair being mounted upon separate axles and arranged in tandem, one of the axles being steerable and comprising an upper part carried by the body and movable laterally therewith, a lower part disposed beneath said upper part and providing a bearing support for said upper part, obliquely-arranged arms carried by said upper part and arranged one on each side of the longitudinal axis of the vehicle, the axes of said arms being so arranged that they converge in said longitudinal axis, each of said arms being formed with two offset slots joined by a substantially straight slot, said straight slot having its axis normal to said vehicle axis, steering pins carried by said lower part and engageable with the coacting slots of said arms, and a notch formed in the rear face of each straight slot for engagement with said steering pins when the vehicle is traveling in a straight course.

4. The combination with a vehicle having more than one pair of rear wheels, each pair being mounted upon separate axles and arranged in tandem, one of the axles being steerable and comprising an upper part carried by the body and movable laterally therewith, a lower part disposed beneath said upper part and providing a bearing support for said upper part, obliquely-arranged arms carried by said upper part and arranged one on each side of the longitudinal axis of the vehicle, the axes of said arms being so arranged that they converge in said longitudinal axis, each of said arms being formed with two offset slots joined by a substantially straight slot, said straight slot having its axis normal to said vehicle axis, steering pins carried by said lower part and engageable with the coacting slots of said arms, a helical spring disposed in one of each of the pairs of offset slots and bearing against the engaged steering pin, and a notch formed in the rear face of each straight slot for engagement with said steering pins when the vehicle is traveling in a straight course.

References Cited in the file of this patent

FOREIGN PATENTS 560,080     Great Britain _ _ _ _ _ _ _ _ _ _ Mar. 20, 1944